US012630367B2

(12) United States Patent
Nguyenquang et al.

(10) Patent No.: US 12,630,367 B2
(45) Date of Patent: May 19, 2026

(54) TRANSPORT SYSTEM, TRANSPORT METHOD, AND RECORDING MEDIUM RECORDING TRANSPORT PROGRAM

(71) Applicant: SHARP KABUSHIKI KAISHA, Sakai City (JP)

(72) Inventors: Thinh Nguyenquang, Sakai City (JP); Akihiro Yamakawa, Sakai City (JP); Takashi Iwamoto, Sakai City (JP); Hiroshi Yamauchi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 509 days.

(21) Appl. No.: 18/204,680

(22) Filed: Jun. 1, 2023

(65) Prior Publication Data

US 2023/0391555 A1     Dec. 7, 2023

(30) Foreign Application Priority Data

Jun. 2, 2022     (JP) ................................. 2022-090157

(51) Int. Cl.
*B65G 1/137*          (2006.01)
*B65G 69/00*          (2006.01)

(52) U.S. Cl.
CPC .......... *B65G 1/1378* (2013.01); *B65G 69/001* (2013.01)

(58) Field of Classification Search
CPC ... B65G 1/1378; B65G 69/001; B65G 1/1375
See application file for complete search history.

(56) References Cited

U.S. PATENT DOCUMENTS

2018/0357906 A1* 12/2018 Yaldo ..................... G08G 1/202

FOREIGN PATENT DOCUMENTS

| CN | 113184430 A | * | 7/2021 | .......... B65G 1/1373 |
| CN | 113689140 A | * | 11/2021 | .......... G06Q 10/087 |
| JP | H11-212643 A | | 8/1999 | |
| KR | 20220013341 A | * | 2/2022 | .......... B65G 1/1373 |

* cited by examiner

*Primary Examiner* — Justin Holmes
(74) *Attorney, Agent, or Firm* — ScienBiziP, P.C.

(57)          ABSTRACT

A transport system includes: a reception processor that receives a transport request to transport a first picking object corresponding to a first automatic transport device; and a determination processor that determines a destination of the first automatic transport device based on the number of automatic transport devices present in a first picking area that includes a first picking location for the first picking object and space availability at one or more picking locations in the first picking area.

10 Claims, 8 Drawing Sheets

| PRODUCT ID | PRODUCT NAME | SHELF ID |
|---|---|---|
| 0001 | PRODUCT A | T1 |
| 0002 | PRODUCT B | T2 |
| 0003 | PRODUCT C | T3 |
| ... | ... | ... |

| UNIT ORDER ID | CUSTOMER ID | ORDERED PRODUCT | QUANTITY | ORDER DATE AND TIME |
|---|---|---|---|---|
| O1 | CUSTOM1 | PRODUCT E | 2 | ... |
| O2 | CUSTOM1 | PRODUCT F | 3 | ... |
| O3 | CUSTOM2 | PRODUCT G | 5 | ... |
| O4 | CUSTOM2 | PRODUCT H | 5 | ... |

| ORDER SET ID | UNIT ORDER ID | SHELF ID |
|---|---|---|
| SET1 | O1, O2, O3, O4 | T3 |
| SET2 | ... | ... |
| ... | ... | ... |

| AREA NAME | NUMBER OF DEVICES IN AREA | PICKING LOCATION | SPACE AVAILABILITY |
|---|---|---|---|
| AR1 | 2 DEVICES | p1 | FULL |
| | | p2 | AVAILABLE |
| | | p3 | FULL |
| | | p4 | AVAILABLE |
| AR2 | 3 DEVICES | p5 | AVAILABLE |
| | | p6 | AVAILABLE |
| | | p7 | FULL |
| | | p8 | AVAILABLE |
| | | p9 | AVAILABLE |
| | | p10 | AVAILABLE |
| | | p11 | AVAILABLE |
| | | p12 | AVAILABLE |
| AR3 | 1 DEVICE | p13 | AVAILABLE |
| | | p14 | AVAILABLE |
| | | p15 | FULL |
| | | p16 | AVAILABLE |
| AR4 | 1 DEVICE | – | AVAILABLE |
| At1 | 0 DEVICE | – | AVAILABLE |
| At2 | 2 DEVICES | – | FULL |
| At3 | 0 DEVICE | – | AVAILABLE |
| At4 | 1 DEVICE | – | AVAILABLE |
| At5 | 0 DEVICE | – | AVAILABLE |

TRANSPORT SYSTEM, TRANSPORT METHOD, AND RECORDING MEDIUM RECORDING TRANSPORT PROGRAM

INCORPORATION BY REFERENCE

This application is based upon and claims the benefit of priority from the corresponding Japanese Patent Application No. 2022-090157 filed on Jun. 2, 2022, the entire contents of which are incorporated herein by reference.

BACKGROUND

The present disclosure relates to a transport system, a transport method, and a recording medium recording a transport program thereon.

Conventional systems are known in which an automatic transport device in a warehouse or the like receives a transport object item at a storage location (for example, storage shelf) and transports the transport object item to a shipping location (dispatching zone).

For example, a known system calculates the congestion degree in each of a plurality of predetermined subareas and moves an automatic transport device present in a subarea having a higher congestion degree to a subarea having a lower congestion degree.

The conventional system makes, for example, a plan for the automatic transport device in advance, determining which order to handle and in what sequence, so that the automatic transport device performs automatic traveling (transport processing) at a predetermined clock time in accordance with the plan. Moving the automatic transport device to a subarea having a lower congestion degree for a subarea having a high congestion degree, if any, results in loss of time, leading to a decrease in transport efficiency. However, no conventional method has been proposed to prevent or reduce such a decrease in transport efficiency.

SUMMARY

An objective of the present disclosure is to provide a transport system, a transport method, and a recording medium recording a transport program thereon that make it possible to prevent or reduce a decrease in transport efficiency due to congestion when transport work is performed by a plurality of automatic transport devices.

A transport system according to an aspect of the present disclosure is a system for causing each of a plurality of automatic transport devices to transport picking objects in a transport area that includes a plurality of picking areas that each include a plurality of picking locations for the automatic transport devices to pick up the picking objects. The transport system includes a reception processor and a determination processor. The reception processor receives a transport request to transport a first picking object corresponding to a first automatic transport device. The determination processor determines a destination of the first automatic transport device based on the number of automatic transport devices present in a first picking area that includes a first picking location for the first picking object and space availability at one or more picking locations in the first picking area.

A transport method according to another aspect of the present disclosure is a method for causing each of a plurality of automatic transport devices to transport picking objects in a transport area that includes a plurality of picking areas that each include a plurality of picking locations for the automatic transport devices to pick up the picking objects. In the transport method, one or more processors execute: receiving a transport request to transport a first picking object corresponding to a first automatic transport device; and determining a destination of the first automatic transport device based on the number of automatic transport devices present in a first picking area that includes a first picking location for the first picking object and space availability at one or more picking locations in the first picking area.

A recording medium according to another aspect of the present disclosure is a recording medium recording a program thereon for causing each of a plurality of automatic transport devices to transport picking objects in a transport area that includes a plurality of picking areas that each include a plurality of picking locations for the automatic transport devices to pick up the picking objects. The program causes one or more processors to execute processing including: receiving a transport request to transport a first picking object corresponding to a first automatic transport device; and determining a destination of the first automatic transport device based on the number of automatic transport devices present in a first picking area that includes a first picking location for the first picking object and space availability at one or more picking locations in the first picking area.

The present disclosure can provide a transport system, a transport method, and a recording medium recording a transport program thereon that make it possible to prevent or reduce a decrease in transport efficiency due to congestion when transport work is performed by a plurality of automatic transport devices.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram showing an example of product information that is used in the transport system according to the embodiment of the present disclosure.

FIG. 4 is a diagram showing an example of order information that is used in the transport system according to the embodiment of the present disclosure.

FIG. 5 is a diagram showing an example of transport information that is used in the transport system according to the embodiment of the present disclosure.

FIG. 8 is a diagram showing an example of congestion conditions with automatic transport devices according to the embodiment of the present disclosure.

DETAILED DESCRIPTION

The following describes an embodiment of the present disclosure with reference to the accompanying drawings to facilitate understanding of the present disclosure. Note that the embodiment described below is an example in which the present disclosure is embodied, and does not limit the technical scope of the present disclosure.

Transport System 10

Figure 1:
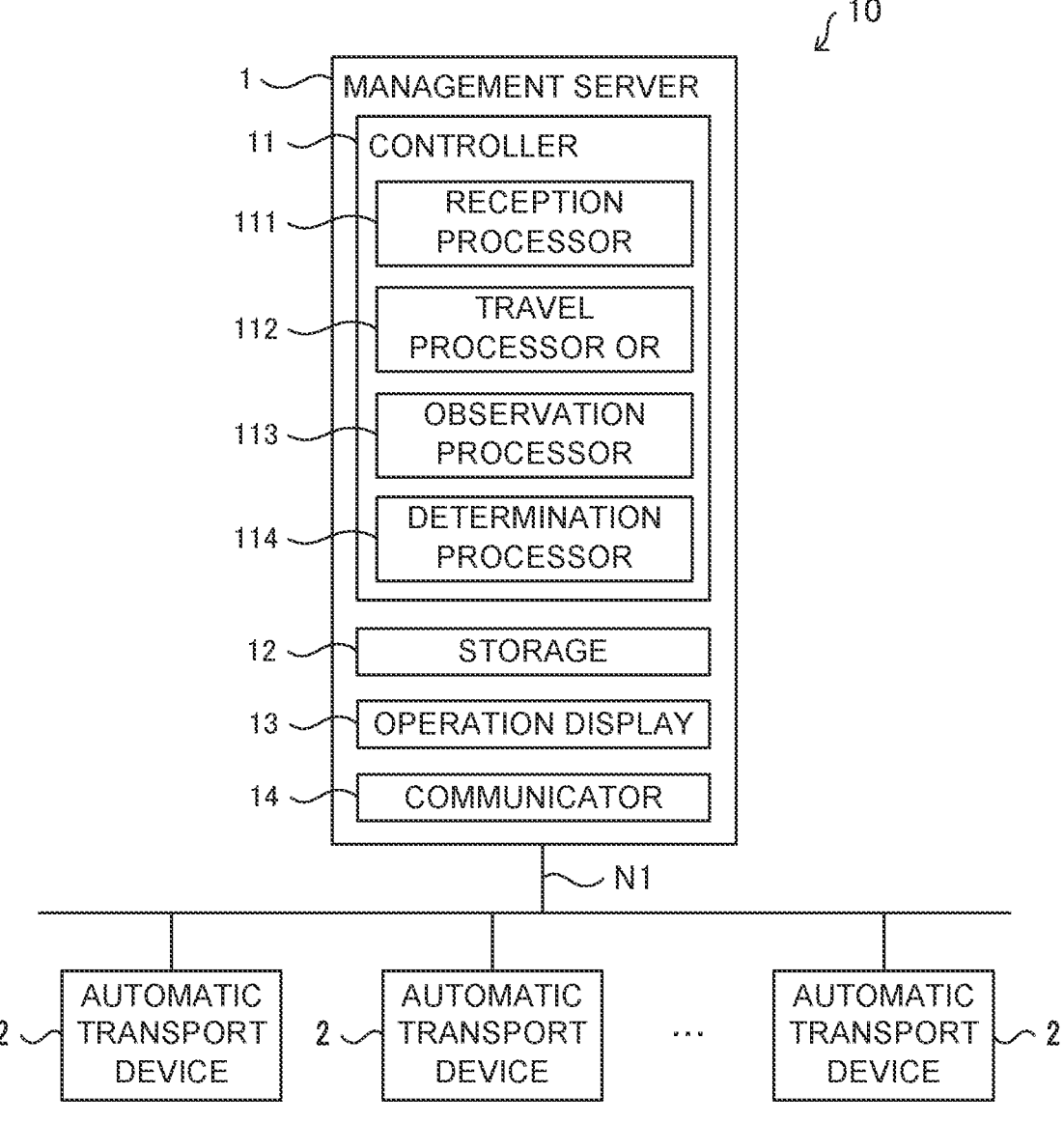
FIG. 1 is a block diagram illustrating a configuration of a transport system according to an embodiment of the present disclosure.

As illustrated in FIG. 1, a transport system 10 according to an embodiment of the present disclosure includes a management server 1 and automatic transport devices 2 (also referred to as AGVs or unmanned transport devices). The management server 1 and the automatic transport devices 2 can communicate with each other via a communication network N1 such as a wireless LAN.

The transport system 10 sets a plurality of paths along which each automatic transport device 2 can travel, and designates a path for the automatic transport device 2 to travel along as a travel route from among the plurality of paths so that the automatic transport device 2 transports a transport object from a storage location to a destination location. The transport system 10 is applied, for example, to factories, warehouses, and other facilities where products (transport objects) are stored. For example, the transport system 10 outputs a transport instruction to an automatic transport device 2 when the transport system 10 receives an order for a product from a customer (customer terminal). Upon obtaining the transport instruction, the automatic transport device 2 moves to a storage location (storage shelf) storing the product, picks up the product, and transports the product to a dispatching zone. The customer can place an order for a product by accessing a website (order page) operated by an order server (not shown) using an information processing device (customer terminal) such as a personal computer or a smartphone.

The order server can receive orders for products from respective customer terminals, and aggregates and outputs, to the management server 1, the thus received order information. The management server 1 manages operation of each of the plurality of automatic transport devices 2 and outputs a transport instruction (travel instruction) to each automatic transport device 2 based on the order information. Each automatic transport device 2 autonomously travels along a preset travel route based on the transport instruction, picks up products included in the order information from storage shelves, and transports the products to the dispatching zone. No particular limitations are placed on the autonomous traveling method employed by the automatic transport devices 2, and a known method may be employed. For example, the automatic transport devices 2 may employ a method using magnetic tape applied onto the floor and markers that specify traveling actions (control information).

Each automatic transport device 2 carries, for example, a plurality of containers (receptacles), and each container holds a product(s) ordered by a customer, so that the automatic transport device 2 can transport a plurality of customers' products all at once through a single picking travel (a travel from a waiting zone to the dispatching zone via relevant shelves). For example, in a case where the automatic transport device 2 carries two containers, the automatic transport device 2 can transport products ordered by two customers at once. The management server 1 outputs, to each automatic transport device 2, a transport instruction corresponding to order information of one or more customers.

Figure 2:
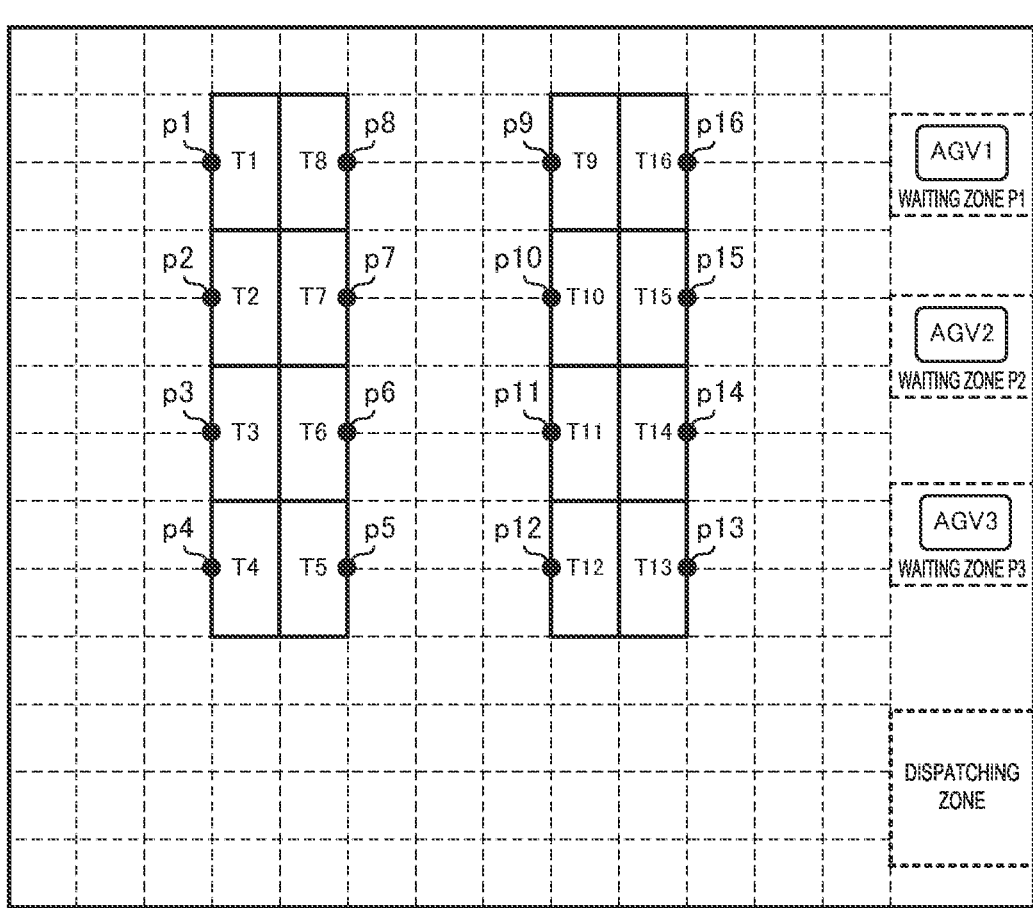
FIG. 2 is a diagram schematically illustrating a configuration of a facility to which the transport system according to the embodiment of the present disclosure is applied.

The present embodiment is described using an example in which the transport system 10 is applied to a facility W1 illustrated in FIG. 2. The facility W1 illustrated in FIG. 2 has a plurality of storage shelves (storage locations) where products (transport objects) are stored. FIG. 2 shows, as an example, 16 storage shelves T1 to T16. Locations for the automatic transport devices 2 to pick up products (picking locations p1 to p16) are set for the respective storage shelves T1 to T16.

The facility W1 also has waiting zones set for the automatic transport devices 2. For example, the facility W1 has a waiting zone P1 where an AGV 1 is kept waiting, a waiting zone P2 where an AGV 2 is kept waiting, and a waiting zone P3 where an AGV 3 is kept waiting. Each automatic transport device 2 is kept waiting in a predetermined waiting zone when no transport instruction is received from the management server 1.

Each automatic transport device 2 moves from the waiting zone to a storage shelf where an ordered product(s) is stored, once the automatic transport device 2 obtains a transport instruction from the management server 1. For example, when the AGV 1 obtains, from the management server 1, a transport instruction that indicates order information including a product stored in a storage shelf T1, the AGV 1 moves to the picking location p1 corresponding to the storage shelf T1 along a preset travel route, picks up the ordered product at the picking location p1 or receives the ordered product from a worker assigned to picking work at the picking location p1, and then moves to the dispatching zone along the preset travel route.

In the present embodiment, the transport system 10 corresponds to a transport system according to the present disclosure. However, the transport system according to the present disclosure may only include the management server 1, or may include one or more elements of configuration of the management server 1 and the automatic transport devices 2.

Management Server 1

As illustrated in FIG. 1, the management server 1 includes a controller 11, a storage 12, an operation display 13, and a communicator 14. The management server 1 is not limited to being a single computer, and may be a computer system in which a plurality of computers operate in conjunction with one another. Furthermore, various types of processing to be executed by the management server 1 may be executed by one or more processors in a distributed manner.

The communicator 14 is a communication interface for connecting the management server 1 to the communication network N1 in a wired or wireless manner and executing data communication with one or more automatic transport devices 2 via the communication network N1 in accordance with a predetermined communication protocol.

The operation display 13 is a user interface including a display that displays various types of information, such as a liquid-crystal display or an organic EL display, and an operation acceptor that receives operations, such as a mouse, a keyboard, or a touch panel.

The storage 12 is a non-volatile storage such as a hard disk drive (HDD) or a solid state drive (SSD) that stores various types of information therein. Specifically, data such as product information D1, order information D2, and transport information D3 is stored in the storage 12. The product information D1 includes information about products stored in the facility W1. The order information D2 includes information about orders placed by customers. FIG. 3 is a diagram showing an example of the product information D1, FIG. 4 is a diagram showing an example of the order information D2, and FIG. 5 is a diagram showing an example of the transport information D3.

As shown in FIG. 3, the product information D1 includes, for each product, corresponding information such as "product ID", "product name", and "shelf ID". The "product ID" refers to identification information of the product, and the "product name" refers to the name of the product. The "shelf ID" refers to identification information of the storage shelf where the product is stored. In the present embodiment, for example, "T1" indicating the storage shelf T1, "T2" indicating the storage shelf T2, "T3" indicating the storage shelf T3, and so on are registered as the shelf IDs.

The product information D1 is, for example, stored in the storage 12 in advance through a registration operation performed by a manager of the facility W1. The manager can also update the product information D1 as appropriate.

As shown in FIG. 4, the order information D2 includes, for each order (order placement), corresponding "unit order ID", "customer ID", "ordered product", "quantity", "order date and time", and so on. The "unit order ID" refers to identification information of a single order, and the "customer ID" refers to identification information of a customer who ordered a product. The "ordered product" refers to the name of the product ordered by the customer, and the "quantity" refers to the number of ordered products. The "order date and time" refers to information on date and time the order was received from the customer.

The order information D2 is registered by the controller 11 each time the management server 1 (or the order server) receives an order from a customer.

As shown in FIG. 5, the transport information D3 includes, for each order set obtained by combining unit orders, corresponding "order set ID", "unit order ID", "shelf ID", and so on. The "order set ID" refers to identification information of an order set obtained by combining unit orders. The controller 11 generates an order set by combining unit orders based on information such as storage locations for products, current positions of the automatic transport devices 2, and operation rules.

The transport information D3 is included in transport instructions that are transmitted to the automatic transport devices 2. For example, when the AGV 1 obtains a transport instruction including transport information D3 related to "SET1", the AGV 1 moves to the position of a shelf ID "T3" included in the transport information D3. The AGV 1 then picks up products respectively having unit order IDs "O1", "O2", "O3", and "O4" from the storage shelf T3.

The controller 11 generates the transport information D3 (see FIG. 5) by referring to the product information D1 (see FIG. 3).

Note that in another embodiment, some or all of the product information D1, the order information D2, and the transport information D3 may be stored in another server accessible from the management server 1 via the communication network N1. In this case, the controller 11 of the management server 1 may acquire the information from the other server and execute processes such as transport processing described below (see FIG. 10).

The storage 12 also stores therein control programs such as a transport program for causing the controller 11 to execute the transport processing described below (see FIG. 10). The transport program is, for example, non-transitorily recorded on a computer-readable recording medium such as a CD or a DVD, read by a reading device (not shown) such as a CD drive or a DVD drive included in the management server 1, and stored in the storage 12.

The controller 11 has control devices such as a CPU, ROM, and RAM. The CPU is a processor that executes various types of arithmetic processing. The ROM is a non-volatile storage that pre-stores therein control programs such as a BIOS and an OS for causing the CPU to execute the various types of arithmetic processing. The RAM is a volatile or non-volatile storage that stores therein various types of information, and is used as transitory storage memory (work area) for various processes that are executed by the CPU. The controller 11 controls the management server 1 by causing the CPU to execute various control programs prestored in the ROM or the storage 12.

Specifically, as illustrated in FIG. 1, the controller 11 includes various processors such as a reception processor 111, a travel processor 112, an observation processor 113, and a determination processor 114. Note that the controller 11 functions as the various processors through the CPU executing various types of processing in accordance with the transport program. Some or all of the aforementioned processors may be composed of an electronic circuit. Note that the transport program may be a program for causing a plurality of processors to function as the aforementioned processors.

The reception processor 111 receives a transport request (picking order) for products (transport objects) corresponding to an automatic transport device 2. Specifically, the reception processor 111 receives order information D2 (see FIG. 4) corresponding to a plurality of customers' orders. For example, the reception processor 111 receives order information D2 (see FIG. 4) including orders of customers CUSTOM1 and CUSTOM2.

Upon receiving the order information D2, the reception processor 111 generates transport information D3. For example, when the reception processor 111 receives order information D2 (see FIG. 4) including four orders (unit orders) of the customers CUSTOM1 and CUSTOM2, the reception processor 111 generates transport information D3 (see FIG. 5) related to "SET1" by referring to the product information D1 (see FIG. 3). For example, the reception processor 111 generates the transport information D3 by combining products stored in the same area into a single order (order set) among the plurality of products included in the order information D2. The reception processor 111 generates the transport information D3 by assigning the products to the plurality of containers carried by the automatic transport device 2.

The travel processor 112 controls the automatic traveling of the automatic transport device 2. Specifically, the travel processor 112 sets a travel route from the current position of the automatic transport device 2 to a storage location (storage shelf) based on the transport request received by the reception processor 111.

Note here that the travel processor 112 acquires the current positions of all the automatic transport devices 2. Each automatic transport device 2 transmits information such as current position, traveling speed, direction of movement, and traveling state (traveling or waiting) to the management server 1 in real time. Based on the information transmitted from each automatic transport device 2, the travel processor 112 selects one automatic transport device 2 and assigns the transport information D3 to the selected automatic transport device 2.

Figure 6:
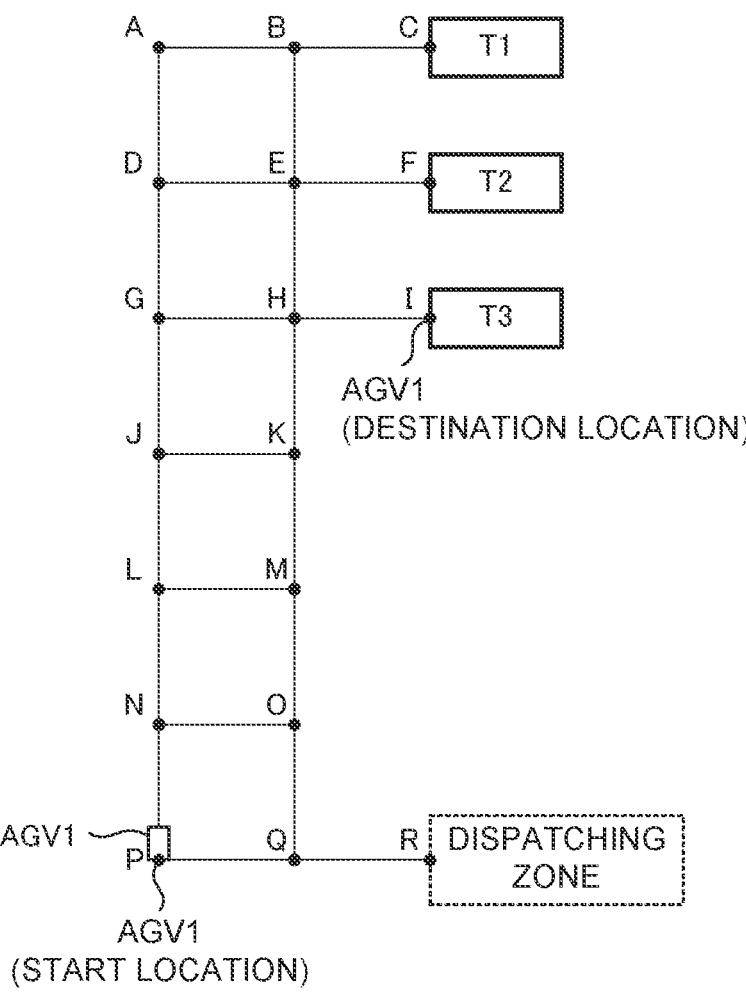
FIG. 6 is a diagram showing an example of a travel route of an automatic transport device according to the embodiment of the present disclosure.

The travel processor 112 sets a travel start location and a destination location for the automatic transport device 2 assigned the transport information D3. FIG. 6 schematically illustrates some areas of the facility W1. Reference signs A to R indicate points in the facility W1, and straight lines connecting the points indicate paths along which the automatic transport device 2 can travel. For example, the reception processor 111 assigns the transport information D3 related to "SET1" to the AGV 1. In this case, as shown in FIG. 6, the travel processor 112 sets the travel start location of the AGV 1 to the point P and the destination location thereof to the point I (picking location p3).

After setting the travel start location and the destination location for the AGV 1, the travel processor 112 sets a travel route from the travel start location to the destination location. Specifically, the travel processor 112 performs operation simulations for all the automatic transport devices 2, and sets the travel route and control information that allow the sum of transport times for all the automatic transport devices 2 to be the shortest.

For example, the travel processor 112 first observes travel conditions (current position, traveling speed, reserved travel route, and estimated arrival time for the reserved travel route) of the other automatic transport devices 2 (in this case, the AGV 2 and the AGV 3). Next, the travel processor 112 performs operation simulations for all the automatic transport devices 2 in parallel and sets the travel route for the AGV 1 to move from the point P to the point I so that the sum of transport times for all the AGVs is the shortest.

The travel processor 112 also sets the control information that specifies actions of the automatic transport device 2 in association with markers on the travel route. Specifically, the travel processor 112 sets the control information including information that indicates the direction of movement toward the next marker position at each marker position (for example, straight ahead, left turn, or right turn) and information that indicates, for example, the traveling speed, acceleration, stop, or turn at each marker position. The markers are provided at the points A to R.

The travel processor 112 outputs travel route information including the travel route and the control information to the automatic transport device 2. In the present example, the travel processor 112 outputs the travel route information and the control information to the AGV 1. Upon obtaining the travel route information and the control information, the AGV 1 starts traveling along the set travel route. In this way, the travel processor 112 controls the automatic traveling of each automatic transport device 2.

Note here that a transport area (facility W1) can have congestion, which refers to concentration of some automatic transport devices 2 in a certain area. If congestion involving an automatic transport device 2 occurs in the conventional system, the automatic transport device 2 is moved to a subarea having a lower congestion degree. Moving the automatic transport device 2 results in loss of time, leading to a decrease in transport efficiency. By contrast, as described below, the transport system 10 according to the present embodiment has a configuration that makes it possible to prevent or reduce a decrease in transport efficiency due to congestion when transport work is performed by the plurality of automatic transport devices 2.

Specifically, the observation processor 113 observes the state of all the automatic transport devices 2 in the transport area (facility W1), the state of a plurality of picking areas included in the transport area, and the state of the plurality of picking locations included in each picking area.

Figure 7:
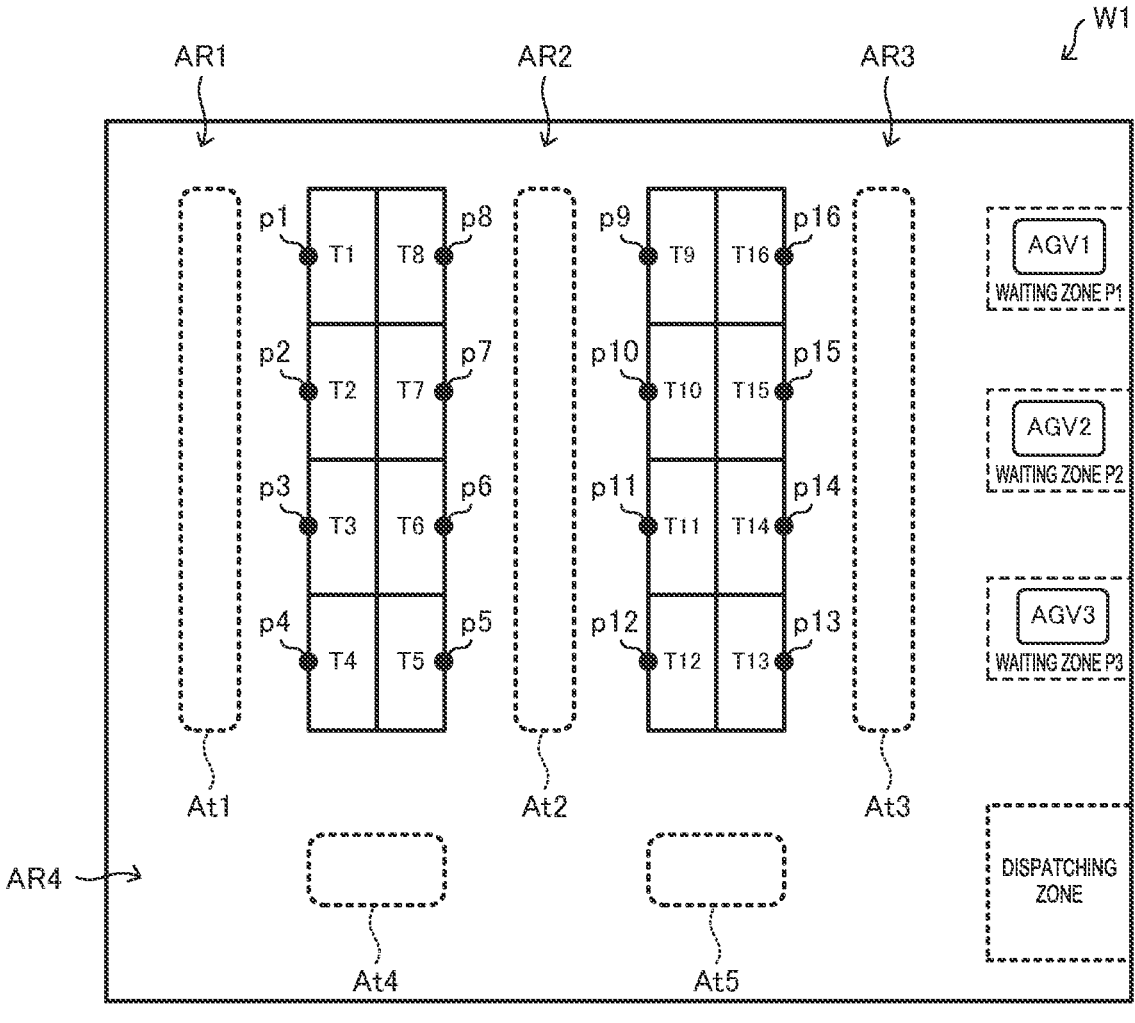
FIG. 7 is a diagram showing examples of picking areas and waiting areas set in the facility according to the embodiment of the present disclosure.

For example, as shown in FIG. 7, the facility W1 has a picking area AR1, which is an area set for the automatic transport devices 2 to pick up products at the picking locations p1 to p4 corresponding to the storage shelves T1 to T4, a picking area AR2, which is an area set for the automatic transport devices 2 to pick up products at the picking locations p5 to p12 corresponding to the storage shelves T5 to T12, and a picking area AR3, which is an area set for the automatic transport devices 2 to pick up products at the picking locations p13 to p16 corresponding to the storage shelves T13 to T16. The facility W1 further has a moving area AR4, which is an area set for the automatic transport devices 2 to move between the picking areas AR1 to AR3. Note that in each picking area, the storage shelves are used to store products having the same characteristics.

Each of the picking areas AR1 to AR3 and the moving area AR4 in the facility W1 has a waiting area(s) (waiting location) set for the automatic transport devices 2 to be kept waiting. For example, a waiting area At1 is set in the picking area AR1, a waiting area At2 is set in the picking area AR2, a waiting area At3 is set in the picking area AR3, and waiting areas At4 and At5 are set in the moving area AR4.

Each of the picking areas AR1 to AR3, the moving area AR4, and the waiting areas At1 to At5 has an upper device number limit set to limit the number of automatic transport devices 2 acceptable therein. Note that instead of the upper device number limit, an upper density limit (value of the upper limit on the ratio of the number of automatic transport devices 2 to the total area of the area) may be set.

Based on the position information of each automatic transport device 2, the observation processor 113 determines, for each of the picking areas AR1 to AR3, the moving area AR4, and the waiting areas At1 to At5, the number of automatic transport devices 2 present in the area and space availability (occupied or unoccupied) in the area. The observation processor 113 registers information resulting from the determination as observation information D4. FIG. 8 shows an example of the observation information D4.

As shown in FIG. 8, the observation information D4 includes, for each area, information such as "area name", "number of devices in area", "picking location", and "space availability". The "area name" refers to any of the names of the picking areas AR1 to AR3, the moving area AR4, and the waiting areas At1 to At5. The "number of devices in area" refers to the number of automatic transport devices 2 currently present in the area. The "picking location" refers to any of the picking locations p1 to p16 (see FIG. 7) corresponding to the storage shelves T1 to T16. The "space availability" refers to the availability of space in the area. For example, "available" (unoccupied) is registered if the number of devices in the area is less than the upper device number limit set for the area, and "full" (occupied) is registered if the number of devices in the area is greater than or equal to the upper device number limit set for the area. The observation processor 113 updates the observation information D4 in real time. The observation information D4 is stored in the storage 12.

The determination processor 114 determines a destination of the automatic transport device 2 corresponding to the transport request based on the congestion conditions of the transport area with automatic transport devices 2. Specifically, the determination processor 114 determines the destination of the automatic transport device 2 based on the number of automatic transport devices 2 present in a picking area that includes a picking location for a product (picking object) listed in the transport request and the space availability at one or more picking locations in the picking area.

The following describes specific examples of the method for determining the destination of the automatic transport device 2 (first to seventh configuration examples).

First Configuration Example

Figure 9:
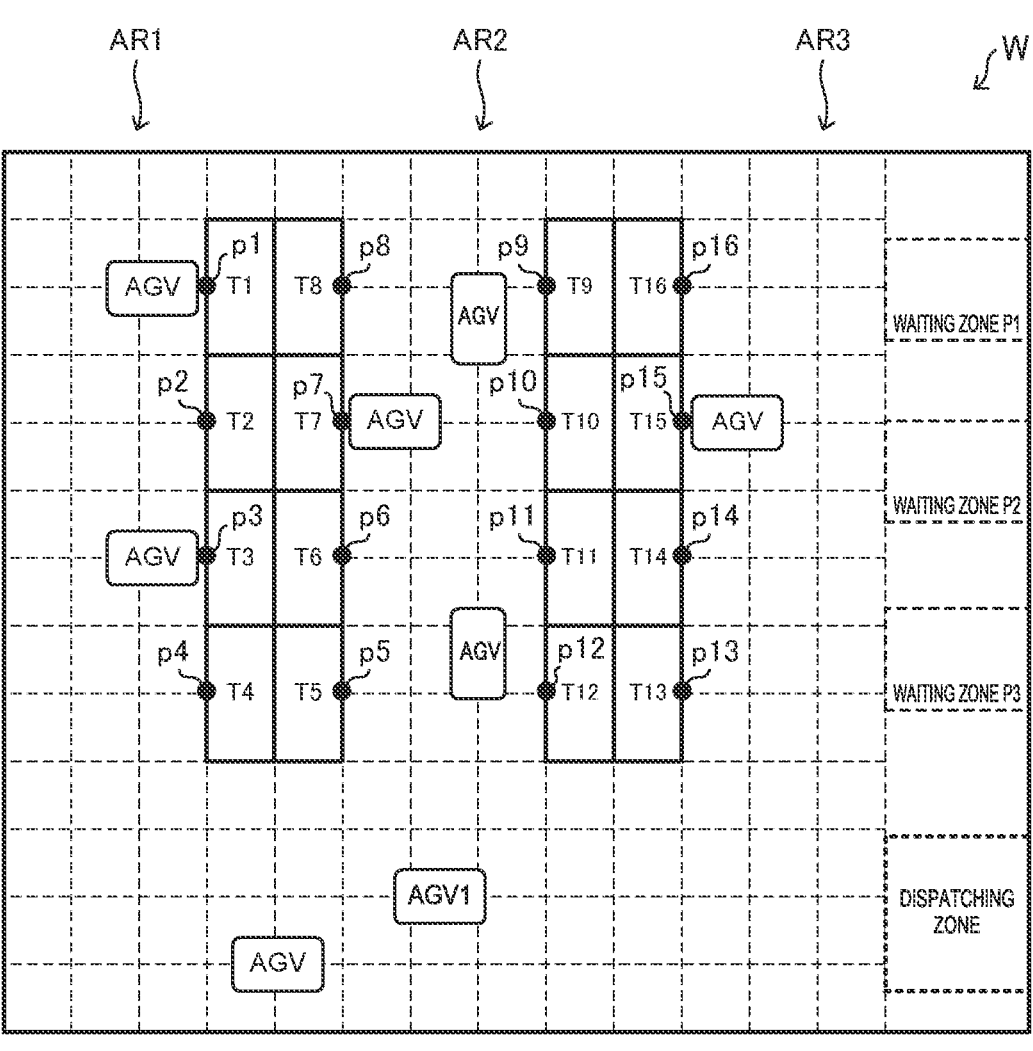
FIG. 9 is a diagram showing an example of observation information that is used in the transport system according to the embodiment of the present disclosure.

In a case where the transport instruction to the AGV 1 indicates that a next picking object is a product on the storage shelf T1 in an example shown in FIG. 9, for example, the travel processor 112 sets the destination location of the AGV 1 to the picking location p1. In this process, the observation processor 113 calculates the number of automatic transport devices 2 present in the picking area AR1 that includes the picking location p1. If the number of automatic transport devices 2 in the picking area AR1 is greater than or equal to the upper device number limit, the determination processor 114 prohibits entry into the picking area AR1 because of the possibility of congestion in the picking area AR1. Accordingly, for example, the determination processor 114 determines to set the destination of the AGV 1 to the waiting area At4 that is the closest to the picking area AR1. The travel processor 112 outputs, to the AGV 1, a travel instruction designating the waiting area At4 as the destination location. Upon obtaining the travel instruction, the AGV 1 moves to the waiting area At4. After arriving at the waiting area At4, the AGV 1 stops and waits until the AGV 1 obtains a next travel instruction.

Second Configuration Example

If the number of automatic transport devices 2 in the picking area AR1 is greater than or equal to the upper device number limit, the determination processor 114 determines whether or not the transport request corresponding to the AGV 1 contains another product (picking object) to be picked up in a different picking area than the picking area AR1. If the transport request contains another product to be picked up in a different picking area, the determination processor 114 identifies the picking location corresponding to such a product.

If there is enough space available at the thus identified picking location, the determination processor 114 determines to set the destination of the AGV 1 to this picking location. For example, in a case where the determination processor 114 identifies the picking location p6 corresponding to another product to be picked up in the picking area AR2 in FIG. 9, and there is enough space available at the thus identified picking location p6, the determination processor 114 determines to set the destination of the AGV 1 to the picking location p6. In this case, the AGV 1 moves from its current position to the picking location p6 in the picking area AR2, skipping the picking area AR1.

Note that if the number of automatic transport devices 2 in the picking area AR1 is less than the upper device number limit when the AGV 1 finishes picking up all products to be picked up in the picking area AR2, the determination processor 114 may determine the destination of the AGV 1 by the method described as a configuration example below.

Third Configuration Example

If there is enough space available at the picking location p1 to be a destination location of the AGV 1 (if the picking location p1 is unoccupied), the determination processor 114 determines to set the destination of the AGV 1 to the picking location p1. Note that the picking location p1 may have a capacity to accept only one automatic transport device 2 at a time or may have a capacity to accept multiple automatic transport devices 2 simultaneously. Based on the determination, the travel processor 112 outputs, to the AGV 1, a travel instruction designating the picking location p1 as the destination location. Upon obtaining the travel instruction, the AGV 1 moves to the picking location p1. After arriving at the picking location p1, the AGV 1 picks up the picking object product there.

Fourth Configuration Example

If there is no enough space available at the picking location p1 to be a destination location of the AGV 1 (if the picking location p1 is occupied), the determination processor 114 determines whether or not the transport request corresponding to the AGV 1 contains another product (picking object) to be picked up in the picking area AR1 to which the picking location p1 belongs. If the transport request contains another product to be picked up in the picking area AR1, the determination processor 114 identifies the picking location corresponding to such a product.

If there is enough space available at the thus identified picking location, the determination processor 114 determines to set the destination of the AGV 1 to this picking location. For example, in a case where the determination processor 114 identifies the picking location p2 corresponding to another product to be picked up in the picking area AR1 in FIG. 9, and there is enough space available at the thus identified picking location p2, the determination processor 114 determines to set the destination of the AGV 1 to the picking location p2. In this case, the AGV 1 moves from its current position to the picking location p2, which is the next picking location, skipping the picking location p1.

If there is enough space available at the picking location p1 when the AGV 1 finishes picking up the product at the picking location p2, the determination processor 114 determines to set the next destination to the picking location p1.

If there is still no enough space available at the picking location p1 when the AGV 1 finishes picking up the product at the picking location p2, and the transport request contains another product to be picked up in the picking area AR1, the determination processor 114 determines the next destination to the picking location corresponding to such a product.

As described above, the determination processor 114 determines destinations of the AGV 1 in the sequence according to the space availability at picking locations for a plurality of picking objects in the same area indicated in the transport request assigned to the AGV 1. If the transport request for the AGV 1 contains products to be picked up in the picking area AR1 and the picking area AR2, the determination processor 114 determines to set the destination of the AGV 1 to the picking area AR2 after the picking work in the picking area AR1 is completed.

Fifth Configuration Example

If there is no enough space available at the picking location p1 to be a destination location of the AGV 1 (if the picking location p1 is occupied), and the transport request corresponding to the AGV 1 does not contain any other product (picking object) to be picked up in the picking area AR1 to which the picking location p1 belongs, the determination processor 114 determines whether or not there is enough space available in the waiting area At1 (see FIG. 7) in the picking area AR1. If there is enough space available in the waiting area At1, the determination processor 114 determines to set the destination of the AGV 1 to the waiting area At1. Note that the waiting area At1 may have a capacity to accept only one automatic transport device 2 at a time or may have a capacity to accept multiple automatic transport devices 2 simultaneously. In the above-described case, the AGV 1 moves to the waiting area At1. After arriving at the waiting area At1, the AGV 1 stops and waits until the AGV 1 obtains a next travel instruction.

Note that the waiting area At1 may be divided into a plurality of subareas respectively corresponding to the plurality of picking locations. In this case, the determination processor 114 determines to set the destination of the AGV 1 to the subarea corresponding to the picking location p1 in the waiting area At1. If there is no enough space available in the subarea corresponding to the picking location p1 in the waiting area At1, the determination processor 114 determines to set the destination of the AGV 1 to a subarea that is close to the picking location p1 and that has enough space available for the AGV 1.

Sixth Configuration Example

If there is no enough space available at the picking location p1 to be a destination location of the AGV 1 (if the picking location p1 is occupied), and the transport request corresponding to the AGV 1 does not contain any other product (picking object) to be picked up in the picking area AR1 to which the picking location p1 belongs, but there is no enough space available in the waiting area At1 (see FIG. 7) in the picking area AR1, the determination processor 114 determines to set the destination of the AGV 1 to the waiting area At4. Note that the waiting area At4 may have a capacity to accept only one automatic transport device 2 at a time or may have a capacity to accept multiple automatic transport devices 2 simultaneously. In this case, the AGV 1 moves to the waiting area At4. After arriving at the waiting area At4, the AGV 1 stops and waits until the AGV 1 obtains a next travel instruction.

As described above, if the determination processor 114 determines that the AGV 1 cannot wait in a picking area, the determination processor 114 determines to set the destination of the AGV 1 to a waiting area outside the picking area (waiting area in the moving area).

Furthermore, the determination processor 114 determines to set the destination of the AGV 1 to the waiting area At4 that is the closest in the moving area AR4 to the destination location (picking location p1). Note that if there is no enough space available in the waiting area At4, the determination processor 114 determines to set the destination of the AGV 1 to another waiting area (waiting area At5) that is next closest in the moving area AR4 to the destination location (picking location p1).

Seventh Configuration Example

If there is no enough space available at the picking location p1 to be a destination location of the AGV 1 (if the picking location p1 is occupied), and the transport request corresponding to the AGV 1 does not contain any other product (picking object) to be picked up in the picking area AR1 to which the picking location p1 belongs, but there is no enough space available in the waiting area At1 (see FIG. 7) in the picking area AR1, the determination processor 114 determines whether or not the transport request corresponding to the AGV 1 contains another product (picking object) to be picked up in a different picking area than the picking area to which the picking location p1 belongs. If the transport request contains another product to be picked up in a different picking area, the determination processor 114 identifies the picking location corresponding to such a product.

If there is enough space available at the thus identified picking location, the determination processor 114 determines to set the destination of the AGV 1 to this picking location. For example, in a case where the determination processor 114 identifies the picking location p6 corresponding to another product to be picked up in the picking area AR2 in FIG. 9, and there is enough space available at the thus identified picking location p6, the determination processor 114 determines to set the destination of the AGV 1 to the picking location p6. In this case, the AGV 1 moves from its current position to the picking location p6 in the picking area AR2, skipping the picking area AR1 (picking location p1).

If there is enough space available at the picking location p1 when the AGV 1 finishes picking up all products in the picking area AR2, the determination processor 114 determines the next destination to the picking location p1.

In this way, the determination processor 114 may change the sequence of movement between picking areas set for the AGV 1 depending on the congestion conditions of the picking areas.

As described above, the determination processor 114 determines the destination of the automatic transport device 2 according to the first or second configuration example described above if the number of automatic transport devices 2 in the picking area is greater than or equal to the upper device number limit, and determines the destination of the automatic transport device 2 according to any of the third to seventh configuration examples described above if the number of automatic transport devices 2 in the picking area is less than the upper device number limit.

Furthermore, the determination processor 114 determines the destination of the automatic transport device 2 based on the space availability at the picking locations in the picking area.

If there is enough space available at multiple picking locations in a picking area at which the automatic transport device 2 is planned to pick up products, the determination processor 114 determines to set the destination of the automatic transport device 2 to one of the multiple picking locations in the picking area.

If there is no enough space available at any of multiple picking locations in a picking area at which the automatic transport device 2 is planned to pick up products, the determination processor 114 determines to set the destination of the automatic transport device 2 to a waiting area within the picking area or a waiting area outside the picking area.

Note that if there is no enough space available at any of the picking locations, the determination processor 114 may determine to set the destination of the automatic transport device 2 to the waiting area within the picking area. Moving the automatic transport device 2 to a waiting area outside the picking area increases the travel distance, resulting in loss of time. The determination processor 114 therefore determines to set the destination of the automatic transport device 2 preferentially to the waiting area within the picking area as long as there is enough space available in the waiting area within the picking area.

If the automatic transport device 2 is planned to pick up a product at another picking location in the picking area, the determination processor 114 may determine to set the destination of the automatic transport device 2 to the waiting area within the picking area. If the automatic transport device 2 is planned to pick up a product at another picking location in the same picking area in the future, moving the automatic transport device 2 to a waiting area outside the picking area results in great loss of time. The determination processor 114 therefore determines to set the destination of the automatic transport device 2 preferentially to the waiting area within the picking area.

If the automatic transport device 2 is not planned to pick up a product at another picking location in the picking area, the determination processor 114 determines to set the destination of the automatic transport device 2 to the waiting area outside the picking area. If the automatic transport device 2 is not planned to pick up a product at another picking location in the same picking area in the future, the automatic transport device 2 does not need to stay in the same area. The determination processor 114 therefore determines to set the destination of the automatic transport device 2 preferentially to the waiting area outside the picking area.

Each picking area may have waiting areas set to respectively correspond to the plurality of picking locations included in the picking area. Each picking location and the waiting area corresponding to the picking location may be assigned a maximum number of automatic transport devices 2 permitted to enter the picking location and the waiting area.

Furthermore, the controller 11 may set priorities on the destination determination methods according to the first to seventh configuration examples. For example, the controller 11 sets higher priorities on the methods that do not involve an interruption of the picking work of the automatic transport device 2, i.e., the methods in which the destination is set to a picking location (second, third, fourth, and seventh configuration examples), and lower priorities on the methods that involve an interruption of the picking work, i.e., the methods in which the destination is set to a waiting area (first, fifth, and sixth configuration examples).

Transport Processing

Figure 10:
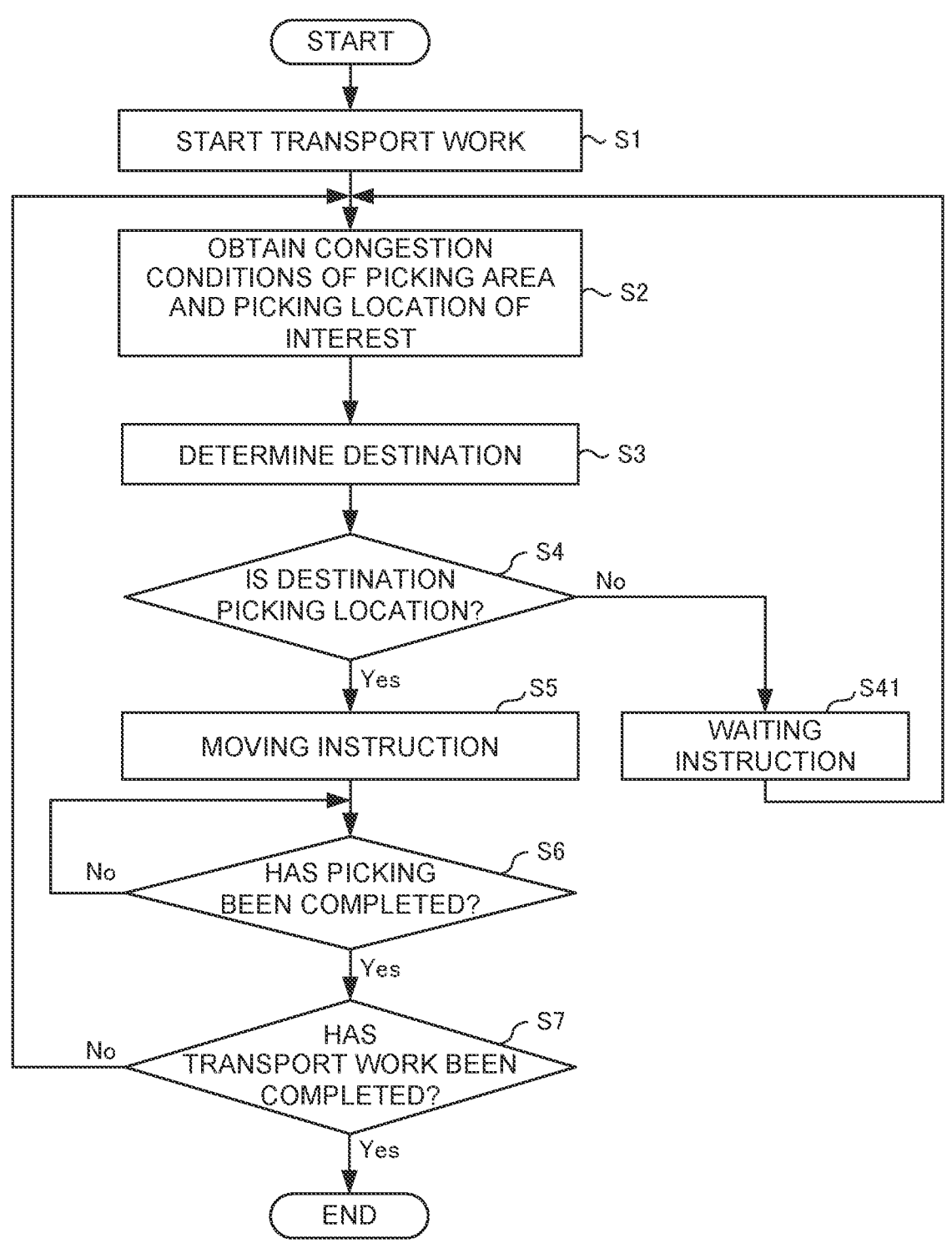
FIG. 10 is a flowchart showing an example of a procedure of transport processing that is executed in the transport system according to the embodiment of the present disclosure.

Referring to FIG. 10, the following describes transport processing that is executed in the transport system 10. Specifically, in the present embodiment, the transport processing is executed by the controller 11 of the management server 1. The controller 11 is capable of executing multiple instances of the transport processing in parallel in response to multiple transport requests to multiple automatic transport devices 2. The controller 11 starts executing the transport processing shown in FIG. 10 upon causing an automatic transport device 2 to start transport work in response to a transport request.

Note that the present disclosure can be considered as a disclosure of a transport method including execution of one or more steps included in the transport processing. Furthermore, any of the one or more steps included in the transport processing described herein may be omitted as appropriate. In addition, the steps in the transport processing may be executed in a different sequence as long as similar operations and effects are obtained. Although the following describes the present disclosure using, as an example, an embodiment in which the controller 11 executes the steps in the transport processing, the present disclosure can include another embodiment concerning a transport method in which the steps in the transport processing are executed by one or more processors in a distributed manner.

First, in Step S1, the controller 11 causes an automatic transport device 2 to start transport work. Specifically, the controller 11 generates the transport information D3 (see FIG. 5) based on the transport request according to the order information D2 (see FIG. 4), and outputs the travel route information and the control information according to the transport information D3 to the automatic transport device 2 to cause the automatic transport device 2 to start the transport work (automatic traveling).

Next, in Step S2, the controller 11 obtains the congestion conditions of a picking area and a picking location for a picking object contained in the transport request. Specifically, the controller 11 acquires the congestion conditions by obtaining, for each of the picking areas AR1 to AR3, the moving area AR4, and the waiting areas At1 to At5, the number of automatic transport devices 2 in the area and the space availability in the area (occupied or unoccupied) based on the position information of each automatic transport device 2.

Next, in Step S3, the controller 11 determines the destination of the automatic transport device 2 corresponding to the transport request based on the congestion conditions. Specifically, the controller 11 determines the destination of the automatic transport device 2 based on the number of automatic transport devices 2 present in the picking area that includes the picking location for the product (picking object) contained in the transport request and the space availability at each picking location in the picking area. For example, the controller 11 determines the destination (a picking location or a waiting area) of the automatic transport device 2 by any of the methods according to the first to seventh configuration examples described above.

Next, in Step S4, the controller 11 determines whether or not the thus determined destination is a picking location. If the determined destination is a picking location (Yes in S4), the controller 11 advances the processing to Step S5. If the determined destination is not a picking location (No in S4), i.e., if the determined destination is a waiting area, the controller 11 advances the processing to Step S41.

In Step S5, the controller 11 outputs, to the automatic transport device 2, a moving instruction for causing the automatic transport device 2 to move from its current position to the determined picking location. Upon obtaining the moving instruction, the automatic transport device 2 moves to the picking location and starts the picking work. After Step S5, the controller 11 advances the processing to Step S6.

In Step S41, the controller 11 outputs, to the automatic transport device 2, a waiting instruction for causing the automatic transport device 2 to move from its current position to the determined waiting area and wait therein. Upon obtaining the waiting instruction, the automatic transport device 2 moves to and waits in the waiting area. After Step S41, the controller 11 returns the processing to Step S2.

In Step S6, the controller 11 determines whether or not the picking of the picking object at the determined picking location has been completed. Upon determining that the picking of the picking object has been completed (Yes in S6), the controller 11 advances the processing to Step S7. The controller 11 waits until the picking of the picking object has been completed (No in S6).

Next, in Step S7, the controller 11 determines whether or not the transport work has been completed. For example, the controller 11 determines that the transport work has been completed when the automatic transport device 2 arrives at a travel end location. Upon determining that the transport work has been completed (Yes in S7), the controller 11 ends the transport processing. Upon determining that the transport work has not been completed (No in S7), the controller 11 returns the processing to Step S2. For example, the controller 11 determines that the transport work has been completed and ends the transport processing described above when the automatic transport device 2 arrives at the destination location after having picked up all the picking objects contained in the transport request. The controller 11 repeats the processes in Steps S2 to S6 until the automatic transport device 2 arrives at the destination location (No in S7).

The controller 11 executes the transport processing described above for each automatic transport device 2 present in the transport area.

As described above, the transport system 10 according to the present embodiment causes each of the plurality of automatic transport devices 2 to transport picking objects in a transport area that includes a plurality of picking areas that each include a plurality of picking locations for the automatic transport devices 2 to pick up the picking objects. Furthermore, the transport system 10 receives a transport request to transport a first picking object corresponding to a first automatic transport device 2, and determines the destination of the first automatic transport device 2 based on the number of automatic transport devices 2 present in a first picking area that includes a first picking location for the first picking object and the space availability at one or more picking locations in the first picking area.

Specifically, the transport system 10 has any of the following configurations to control the traveling of the plurality of automatic transport devices 2 mainly in the transport area (picking site) in order to achieve a reduction in congestion in the transport area as a whole.

Configuration A

In the transport system 10, each picking location has an upper device number limit set to limit the number of automatic transport devices 2 permitted to stop in front of the picking location. For example, in a case where the upper device number limit of the waiting area in front of the picking location p1 is set to three, the total number of devices reserved by any instruction indicating a route to the picking location p1 and devices stopping at the picking location p1 is three or less.

Configuration B

In the transport system 10, each picking location has a density set corresponding to automatic transport devices 2 permitted to wait or travel in front of the picking location. For example, the density of the surroundings of each waiting area and each picking location is set to a predetermined density or less.

Configuration C

In the transport system 10, each picking area (collection of picking locations) has an upper device number limit set to limit the number of automatic transport devices 2 permitted to enter the picking area. In a case where automatic transport devices 2 move to all the picking locations in a picking area, for example, the density of the automatic transport devices 2 in the picking area increases and the efficiency of the traveling control among the automatic transport devices 2 decreases. In the transport system 10, therefore, each picking area has an upper device number limit that limits the number of automatic transport device 2 acceptable therein.

Configuration D

In the configurations A to C described above, if the number of automatic transport devices 2 in a picking location or a picking area is greater than the upper device number limit, an automatic transport device 2 is instructed to wait in a waiting area found between the relevant picking areas or in the relevant picking area until the density and the number of automatic transport devices 2 therein decrease to within respective acceptable ranges.

Configuration E

If an automatic transport device 2 needs to wait to pick up a picking object at a specific picking location in a picking area, and is therefore determined to be first moved to a next planned picking location in the picking area, the transport system 10 instructs the automatic transport device 2 to skip the picking location causing the waiting. The transport system 10 instructs the automatic transport device 2 to return to the skipped picking location after the automatic transport device 2 has completed the picking at the next planned picking location in the picking area. If the number of automatic transport devices 2 at the skipped picking location or in the corresponding waiting area is expected to exceed the upper device number limit when the automatic transport device 2 returns to the skipped picking location, the transport system 10 executes the processing according to Configuration D. Note that the transport system 10 may be capable of switching such a skipping function on and off.

Furthermore, the transport system 10 determines a destination of each automatic transport device 2 in accordance with the following procedure (Steps 1 to 3).

Step 1

The transport system 10 observes surrounding conditions of each picking location. Specifically, the transport system 10 observes, for each picking location, the number of automatic transport devices 2 reserved to go to the picking location or the number of automatic transport devices 2 waiting to pick up a picking object at the picking location. The transport system 10 also observes, for each waiting area, the number of automatic transport devices 2 waiting to stop in the waiting area. The transport system 10 also observes, for each picking area, the total number of automatic transport devices 2 in the picking area.

Step 2

After each automatic transport device 2 has completed the current picking work and before generating a route to the next picking location, the transport system 10 determines a destination to instruct the automatic transport device 2 to go to next, in accordance with information obtained through the observations in Step 1 and priorities described below.

First Priority

If the number of automatic transport devices 2 stopping at or reserved to go to a planned picking location, the density of automatic transport devices 2 in front of the picking location, and the number of automatic transport devices 2 in a corresponding picking area are each less than the upper limit value set therefor, the transport system 10 determines to set the destination to this picking location.

Second Priority

If the first priority conditions are not met, the transport system 10 determines to skip the planned picking location and set the destination to a next picking location in the picking area, if any. The transport system 10 repeats the destination determination according to the first priority until there are no more picking locations in the picking area that meet the first priority conditions, and then instructs the automatic transport device 2 to return to all the skipped picking locations for the picking work.

Third Priority

If the number of automatic transport devices 2 stopping at or reserved to go to the planned picking location, the density of automatic transport devices 2 in front of the picking location, and the number of automatic transport devices 2 in the corresponding picking area are each expected to exceed the upper limit value set therefor, and if the skipping function related to the second priority is off, the transport system 10 may proceed with the picking work in accordance with the planned sequence. In this case, the transport system 10 determines the destination of the automatic transport device 2 based on the following two cases.

Case 1: The next destination is a picking location in the same picking area. If there is a waiting area having enough space in the picking area, the transport system 10 instructs the automatic transport device 2 to move to and wait in this waiting area until the first priority conditions are met. If there is not any waiting area having enough space in the picking area, the transport system 10 searches for a waiting area having enough space outside of the picking area and determines to set the destination of the automatic transport device 2 to the thus found waiting area.

Case 2: The next destination is a picking location in a different picking area. The transport system 10 instructs the automatic transport device 2 to move to and wait in a waiting area in front of the different picking area until the first priority conditions are met. If another automatic transport device(s) 2 is waiting in or has been already reserved to go to the waiting area in front of the different picking area, the transport system 10 searches for a waiting area having enough space in a neighboring picking area and determines to set the destination of the automatic transport device 2 to the thus found waiting area.

Step 3

When the automatic transport device 2 that has been kept waiting according to the first to third priorities in Step 2 becomes permissible by meeting the first priority conditions, the transport system 10 gives a travel instruction preferentially to the automatic transport device 2 meeting the first priority conditions.

The transport system 10 according to the present embodiment makes it possible to give an appropriate travel instruction by updating the destination of each automatic transport device 2 in real time according to the congestion conditions at each of planned picking locations, the picking areas, and the waiting areas. It is therefore possible to prevent or reduce a decrease in transport efficiency due to congestion when transport work is performed by the plurality of automatic transport devices 2.

Statements of Disclosure

The following states a summary of the disclosures extracted from the embodiment(s) described above. Note that elements of configuration and processing functions described in the following statements may be selected as appropriate and combined as desired.

Statement 1

A transport system for causing each of a plurality of automatic transport devices to transport picking objects in a transport area that includes a plurality of picking areas that each include a plurality of picking locations for the automatic transport devices to pick up the picking objects, the transport system including: a reception processor that receives a transport request to transport a first picking object corresponding to a first automatic transport device; and a determination processor that determines a destination of the first automatic transport device based on the number of automatic transport devices present in a first picking area that includes a first picking location for the first picking object and space availability at one or more picking locations in the first picking area.

Statement 2

The transport system described in Statement 1, wherein the determination processor determines the destination of the first automatic transport device based on the space availability at the first picking location in the first picking area.

Statement 3

The transport system described in Statement 1 or 2, wherein if there is enough space available at multiple picking locations in the first picking area at which the first automatic transport device is planned to pick up picking objects, the determination processor determines to set the destination of the first automatic transport device to one of the multiple picking locations in the first picking area.

Statement 4

The transport system described in any one of Statements 1 to 3, wherein if there is no enough space available at any of multiple picking locations in the first picking area at which the first automatic transport device is planned to pick up picking objects, the determination processor determines to set the destination of the first automatic transport device to a first waiting location within the first picking area or a second waiting location outside the first picking area.

Statement 5

The transport system described in Statement 4, wherein if there is no enough space available at the first picking location, the determination processor determines to set the destination of the first automatic transport device to the first waiting location.

Statement 6

The transport system described in Statement 4 or 5, wherein if the first automatic transport device is planned to pick up a picking object at another picking location in the first picking area, the determination processor determines to set the destination of the first automatic transport device to the first waiting location.

Statement 7

The transport system described in any one of Statements 4 to 6, wherein if the first automatic transport device is not planned to pick up a picking object at another picking location in the first picking area, the determination processor determines to set the destination of the first automatic transport device to the second waiting location.

Statement 8

The transport system described in any one of Statements 1 to 7, wherein each picking area has waiting locations set to respectively correspond to the plurality of picking locations included in the picking area, and each picking location and the waiting location corresponding to the picking location are assigned a maximum number of automatic transport devices permitted to enter the picking location and the waiting area.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A transport system for causing each of a plurality of automatic transport devices to transport a plurality of picking objects in a transport area that includes a plurality of picking areas, each of the plurality of picking areas including a plurality of picking locations for the plurality of automatic transport devices to pick up the plurality of picking objects, the transport system comprising:

a reception circuit that receives a transport request to transport a first picking object corresponding to a first automatic transport device;

a determination circuit that determines a destination of the first automatic transport device based on a number of the plurality of automatic transport devices present in a first picking area that includes a first picking location for the first picking object and space availability at one or more picking locations, among the plurality of picking locations, in the first picking area;

at least one processor; and at least one non-transitory computer-readable medium coupled to the at least one processor and storing one or more computer-executable instructions that, when executed by the at least one processor, cause the at least one processor to actively control the plurality of automatic transport devices to transport based on the determination of the destination by the determination circuit and receiving the transport request.

2. The transport system according to claim 1, wherein the determination circuit determines the destination of the first automatic transport device based on space availability at the first picking location in the first picking area.

3. The transport system according to claim 1, wherein, in a case that the space availability is sufficient at the one or more picking locations in the first picking area at which the first automatic transport device is planned to pick up one or more picking objects, among the plurality of picking objects, the determination circuit determines to set the destination of the first automatic transport device to one of the one or more picking locations in the first picking area.

4. The transport system according to claim 1, wherein, in a case that the space availability is insufficient at any of the one or more picking locations in the first picking area at which the first automatic transport device is planned to pick up one or more picking objects, among the plurality of picking objects, the determination circuit determines to set the destination of the first automatic transport device to a first waiting location within the first picking area or a second waiting location outside the first picking area.

5. The transport system according to claim 4, wherein, in a case that space availability is insufficient at the first picking location, the determination circuit determines to set the destination of the first automatic transport device to the first waiting location.

6. The transport system according to claim 4, wherein, in a case that the first automatic transport device is planned to pick up a picking object at another picking location in the first picking area, the determination circuit determines to set the destination of the first automatic transport device to the first waiting location.

7. The transport system according to claim 4, wherein, in a case that the first automatic transport device is not planned to pick up a picking object at another picking location in the first picking area, the determination circuit determines to set the destination of the first automatic transport device to the second waiting location.

8. The transport system according to claim 1, wherein;

each one of the plurality of picking areas has a plurality of waiting locations set to correspond, respectively, to the plurality of picking locations included in the picking area, and each of the plurality of picking locations and each of the plurality of waiting locations corresponding to the picking location are assigned a maximum number of the plurality of automatic transport devices permitted to enter the picking location and the waiting location.

9. A transport method, performed by one or more processors, for causing each of a plurality of automatic transport devices to transport a plurality of picking objects in a transport area that includes a plurality of picking areas, each of the plurality of picking areas including a plurality of picking locations for the plurality of automatic transport devices to pick up the plurality of picking objects, the transport method comprising:

receiving a transport request to transport a first picking object corresponding to a first automatic transport device;

determining a destination of the first automatic transport device based on a number of the plurality of automatic transport devices present in a first picking area that includes a first picking location for the first picking object and space availability at one or more picking locations, among the plurality of picking locations, in the first picking area; and actively controlling the plurality of automatic transport devices to transport based on the determination of the destination and receiving the transport request.

10. A non-transitory computer-readable recording medium coupled to one or more processors and storing one or more transport instructions for causing each of a plurality of automatic transport devices to transport a plurality of picking objects in a transport area that includes a plurality of picking areas, each of the plurality of picking areas including a plurality of picking locations for the plurality of automatic transport devices to pick up the plurality of picking objects, the one or more transport instructions, when executed by the one or more processors, cause the one or more processors to:

receive a transport request to transport a first picking object corresponding to a first automatic transport device;

determine a destination of the first automatic transport device based on a number of the plurality of automatic transport devices present in a first picking area that includes a first picking location for the first picking object and space availability at one or more picking locations, among the plurality of picking locations, in the first picking area; and actively control the plurality of automatic transport devices to transport based on the determination of the destination and receiving the transport request.

* * * * *